United States Patent [19]

Satterfield et al.

[11] 3,845,920
[45] Nov. 5, 1974

[54] INFLATABLE EVACUATION RAMP

[75] Inventors: Robert S. Satterfield, Pleasant Hill; Joseph Chacko, Corte Madera, both of Calif.

[73] Assignee: Sargent Industries, Inc., Los Angeles, Calif.

[22] Filed: Jan. 14, 1972

[21] Appl. No.: 217,783

[52] U.S. Cl. ............... 244/137 P, 182/48, 193/25 B
[51] Int. Cl. .......................................... B64d 25/14
[58] Field of Search .................... 244/137 R, 137 P; 193/25 B; 182/48; 52/2; 9/11 A

[56] References Cited
UNITED STATES PATENTS

| | | | |
|---|---|---|---|
| 3,037,218 | 6/1962 | Brooks | 9/11 A |
| 3,332,176 | 7/1967 | Knetzer | 52/2 |
| 3,433,342 | 3/1969 | Switlik | 193/25 B |
| 3,433,470 | 3/1969 | Erke | 52/2 |
| 3,470,991 | 10/1969 | Holcombe | 244/137 R |
| 3,476,338 | 11/1969 | Fisher | 244/137 R |
| 3,554,344 | 1/1971 | Summer et al. | 193/25 B |
| 3,669,217 | 6/1972 | Fisher | 182/48 |
| 3,692,144 | 9/1972 | Summer et al | 182/48 |

*Primary Examiner*—Trygve M. Blix
*Assistant Examiner*—Galen L. Barefoot
*Attorney, Agent, or Firm*—Ellsworth R. Roston

[57] ABSTRACT

An inflatable ramp, for use in emergency situations on aircraft, including an inflation tube assembly provided with structure to allow the ramp to be properly positioned across the wing of a large aircraft. A flooring material is positioned within the inflation tube assembly to provide suitable walls and flooring on the ramp to ensure the safety of persons traversing it. Suitable airflow paths are provided in the inflation tube assembly to produce predetermined sequential inflation of the assembly to assure that, when the ramp is inflated, it attains a position in which it may be properly used. A slide may be attached to the outer end of the ramp by a releasable stitch-locking which, when necessary, allows the slide to serve as a raft when it is detached from the ramp.

30 Claims, 10 Drawing Figures

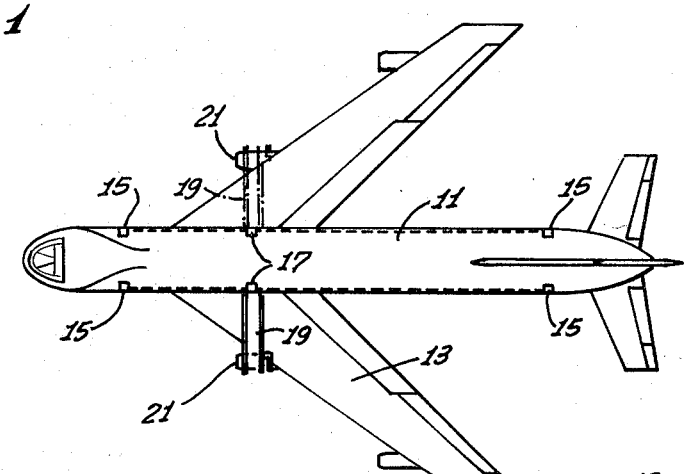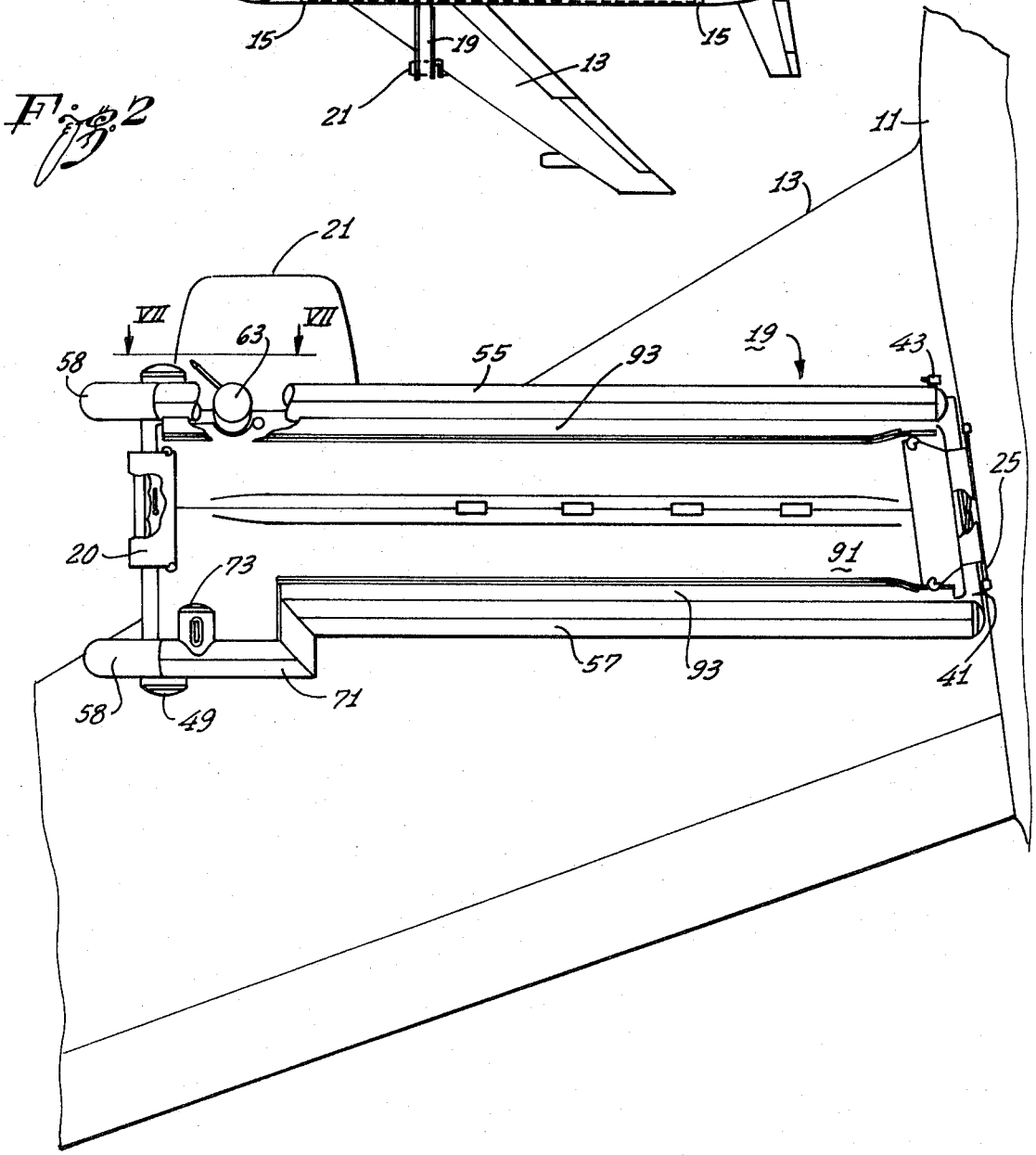

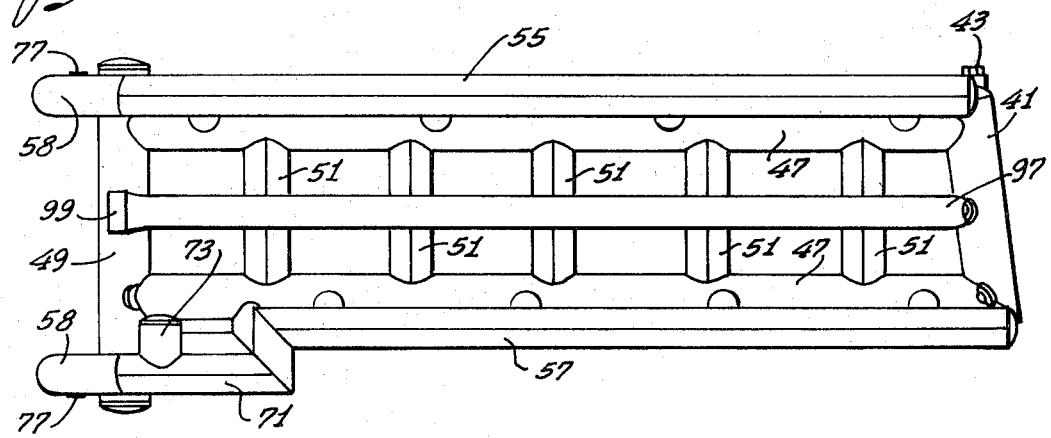
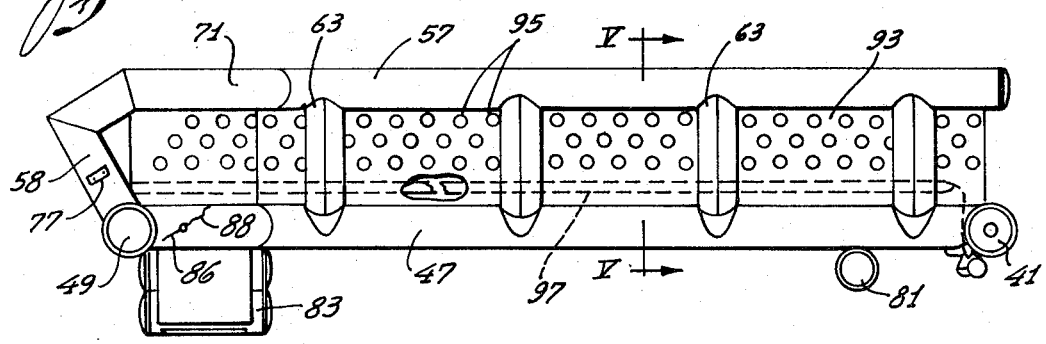
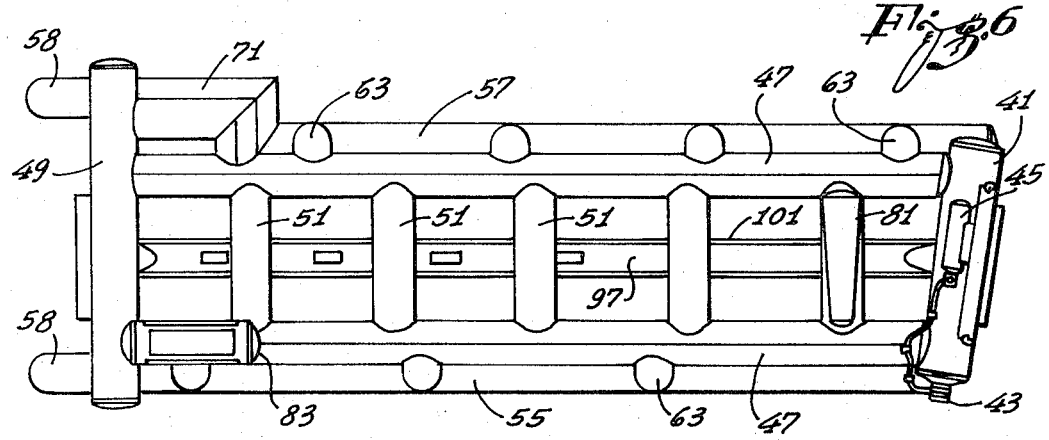
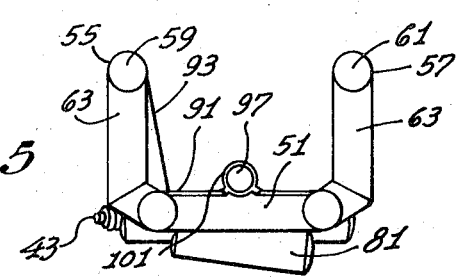

INFLATABLE EVACUATION RAMP

BACKGROUND OF THE INVENTION

When aircraft land under conditions in which no passenger evacuation services are available, such as when they are force-landed or ditched, escape apparatus must be provided so that passenger and crew evacuation can be accomplished in a relatively short period of time in order to ensure safety. In fact, government aircraft safety regulations require that apparatus be provided so that all passengers and crew members can be evacuated from a downed plane within a relatively short period, such as 90 seconds.

In addition to being a safety problem, this requirement also becomes an economic problem since the regulations specify that the number of people who can be evacuated during the regulated time period is the maximum number to be carried by the aircraft at any time. Thus, the evacuation safety loading capacity of the aircraft limits the number of passengers which may be carried in an airplane, even though more passengers could be accomodated in the aircraft in an otherwise safe manner without violating load and balance limitations.

Obviously, even if an aircraft is provided with a built-in stairway, it is desirable to provide some apparatus by means of which passengers can be evacuated at a rate greater than that possible by normal deplaning methods. Therefore it has become common to provide a slide which extends from each of the normal and/or emergency exits of the aircraft to provide an easy means of escape from the exits which, under normal forced landing conditions, are elevated above the ground. In use, an evacuee walks to the door of the aircraft, jumps onto the slide, and slides down to the ground.

In the applicants' copending U.S. patent application Ser. No. 131,270, filed Apr. 5, 1971 and assigned to the assignee hereof, now U.S. Pat. No. 3,712,417, an improved inflatable evacuation slide has been disclosed by means of which evacuees can leave the aircraft safely and in a very short period of time.

In the last few years, a number of "jumbo jets" have been developed and have been, or are about to be placed in operation. In some of those aircraft, emergency exits are located over large swept-back wings. In some cases, those exits are so located that any slide leading from them would merely extend out over the wing and would not provide access to the ground. On the other hand, if an evacuee were to step from the exit onto the wing and walk across it to a location from which he could jump to the ground, he might unnecessarily injure himself and/or damage the wing if the skin of the wing collapsed beneath his weight or had been damaged during the emergency landing. He could also injure himself in jumping from the wing to the ground since the wings on these large aircraft are relatively high.

Therefore, it has become necessary to provide apparatus which will produce an escape route device for evacuees from those above-wing exits in a substantially instantaneous manner. If possible, such a device should be relatively lightweight and easily stored in a small volume within the aircraft. It should also be utilizable with the type of slide taught in the above-cited U.S. Pat. No. 3,712,417 so that evacuees at every exit of the aircraft can enjoy the benefits of identical safety devices.

SUMMARY OF THE INVENTION

The present invention relates to an inflatable ramp which may be quickly and easily extended from a downed or ditched aircraft and onto which evacuees can step quickly and confidently to walk across the aircraft wings and jump onto a slide to travel to the ground. More specifically, the invention relates to such an apparatus in which support structure is provided to complement the wing and present a bridge-type walkway, having railings on either side thereof, from the aircraft exit to the edge of the wing. An inflatable slide of the type disclosed in the above-cited U.S. Pat. No. 3,712,417 is detachably fastened to the outer end of the ramp so that evacuees can slide to the ground. If the aircraft is ditched in water, the wings will be low enough relative to the water surface to allow the slide to act as a raft as disclosed in the cited copending application. In such an event, evacuees can walk across the ramp and step directly onto the raft. When the "raft" is filled, it can be detached from the ramp so that it will not be pulled into the water if the aircraft should sink.

It would be possible, of course, to manufacture the ramp and the slide as a single, integrated unit having a single inflation air supply, etc. However, it is presently believed that a greater degree of safety can be provided by manufacturing the ramp and slide as two distinct units. The two units may be temporarily tied together by suitable means such as by the lock stitch system taught for tying the slide to the aircraft in U.S. Pat. No. 3,712,417. Production as two separate sections allows additional safety since, if one of the units should fail to inflate or become damaged later, the other may still be used. Further, the use of two distinct inflation systems will allow the slide to be quickly and easily detached from the ramp for use as a raft without requiring the use of inflation system couplers, etc., which would also have to be mechanically separated.

In general, the basic portion of the ramp comprises a somewhat rectangular inflatable tube assembly having a relatively long length and narrow width. A pair of inflatable side rails extend upwardly from the longer tubes to prevent evacuees from stepping or falling off the ramp. A number of cross tube members connect the longer tubes of the rectangular base and provide support for a ramp walkway. The walkway is formed as a portion of sheeting material which also extends upwardly from the base along the inside of the railing for evacuee protection.

The cross tube members also support an elongated divider tube which deforms the center part of the walkway in order to clearly delineate the walkway into two different parts and keep the evacuees in two lines. Reference to the above-cited copending application will reveal that such slides may be manufactured with two slide surfaces. Thus, if two columns of evacuees are maintained, the aircraft can be emptied in a speedy and orderly fashion. Of course, if a single slide surface ramp is to be provided, the central divider tube is unnecessary in either the ramp or the slide.

Suspended from beneath the rectangular base of the ramp are various short support tubes which allow the ramp to be properly supported by the wing surface and, for example, by an engine suspended beneath the wing in order to create a subtantially horizontal surface for the convenience of the evacuees.

In order to provide the reassuring help of a trained coordinator of the evacuation, a small offset space is provided at the outer end of the ramp so that a crew member from the aircraft can aid and encourage evacuees in transferring from the ramp to the slide without getting in the way or slowing down the evacuation process.

In order to conserve space aboard the aircraft, the ramp is formed as an inflatable device which can be folded very compactly into a relatively small case. A slide such as that taught in the above-cited copending application may also be folded within the same case and can be attached to the outer end of the ramp. In most aircraft, the case in which the ramp and slide are carried is mounted on the door of the craft and a locking bar is positioned, when the door is closed and locked, so that any opening of the door automatically causes the release and inflation of the ramp unless the locking bar is first detached. As the ramp inflates, its attachment to the craft causes it to be properly located across the surface of the wing. When it is inflated substantially the full amount, a further triggering mechanism will act to begin inflation of the slide so that it is ready for use as soon as the passengers reach the end of the ramp. The automatic inflation of the ramp and the slide will serve to substantially reduce the amount of time required for affecting the evacuation of the aircraft. The slide may be attached to the ramp by a suitable detachable fastening device so that, if the slide is to be used as a raft in water, it can quickly and easily be detached from the ramp as soon as the evacuees have boarded it.

If desired, the ramp may be inflated by an aspirator apparatus such as one of those described in U.S. patent application Ser. No. 68,511 of Joseph Chacko, filed Aug. 31, 1970, now U.S. Pat. No. 3,702,623, or Ser. No. 813,660 of Ronald H. Day, filed Apr. 4, 1969, now U.S. Reissue No. 27,860, both of which have been assigned to the assignee hereof. Such aspirators may be positioned in the tube assembly adjacent the door of the plane.

In use, when the door of the plane is closed, one of the members of the crew fastens the bar attached to the ramp to a position on the floor of the plane just inside the door. If the bar is not released from that position before the door is next opened, opening will cause actuation of the aspirator and the inflation of the ramp. When the ramp is inflated, aspirators acting within the slide will also be actuated to inflate it. When the ramp aspirators begin to inflate the ramp, air enters the rectangular base member and travels through the tubes thereof causing the ramp to unfold and extend in the desired direction. This will also cause the outer end of the ramp to pull the still-folded slide toward the edge of the wing surface so that it may then be inflated in the manner described in the above-cited U.S. Pat. No. 3,712,417.

The extension of the ramp may occur in a manner which is somewhat similar to the extension of the curled, inflatable paper tube of a well-known party noise maker. In other words, the ramp and slide, which are rather tightly folded into a relatively small packet, may be forced across the surface of the wing by the inflation of two elongated tubes which extend along the lower surface of the ramp. This allows the ramp to be sequentially unfolded in a rolling motion as the inflation air travels away from the aircraft and toward the ramp outer extremity through the tubes.

The ramp may be provided with a pair of inflatable waist-high side rails, and protective vertical side walls extending from the rails to the walking surface, which extend along its entire length, but means may be provided for preventing the rails from becoming inflated until the ramp is substantially fully inflated and extended to its entire length. As a result, and also as a result of its being unrolled in a sequential fashion with the slide tightly folded into the center of the unrolling ramp, the entire assembly presents a very low profile as it moves across the wing. Thus, it is relatively undisturbed by wind which may be blowing across the wing and presents little of no sail area to such wind until after it is fully extended and substantially fixed in position by tension in inflated tubes. In other words, the ramp will be placed in its proper position and relatively firmly fixed there before it is even subjected to any substantial wind forces. Consequently, the slide will be properly located for its dependency from the end of the ramp and, after the ramp is fully extended, the slide may be inflated without hanging up on the wing or an engine and thereby becoming useless.

Of course, it will be realized by those skilled in the art that the entire operation involved in the inflation of the ramp and slide is initiated by the opening of the aircraft door without a prior disengagement of the triggering mechanism. Thereafter, the entire operation is preferably automatic and should take only a few seconds.

In summary, the present invention relates to a very strong ramp apparatus which is inflatable in a very short time, supports the weight of a number of persons simultaneously, inflates in a manner such that it is extended in a desired direction from the plane and is supported by suitable surfaces of the plane, and allows for the clear delineation of passenger walkways for evacuation. It is now apparent, therefore, that a ramp of this type will produce the optimum results in allowing evacuation of the aircraft in a very short period of time. It also is now apparent that use of this ramp with a slide as described in the above-referenced copending application will have the economic effect of allowing airlines to carry a greater number of passengers in the plane and still comply with Federal Regulations requiring total evacuation of the craft within a specific time limit.

The invention, together with further objects, advantages, modes, and embodiments will be readily understood by those skilled in the art through reference to the following Detailed Description which is correlated to the accompanying drawings. The drawings illustrate only yhat which is presently considered to be a preferred embodiment of the best mode contemplated for utilizing the novel principles of the invention, whereas the claims accompanying the application delineate the full extent of that invention.

BRIEF DESCRIPTION OF THE DRAWINGS

FIG. 1 is a plan view of an aircraft showing the manner in which ramps formed in accordance with the present invention might extend therefrom;

FIG. 2 is a top plan view of a ramp formed in accordance with the present invention extending from the left side of the aircraft;

FIG. 3 is a view of the ramp similar to that shown in FIG. 2 but with the walkway surface and other materials removed to more clearly illustrate the relationships of the inflatable tubing;

FIG. 4 is a side elevation of the ramp shown in the previous figures as seen from the rear of the aircraft;

FIG. 5 is a sectional view of the ramp as seen along a line V—V of FIG. 4;

FIG. 6 is a bottom elevation of the ramp;

DETAILED DESCRIPTION

Figure 7:
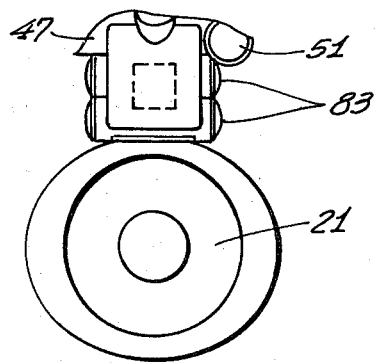
FIG. 7 is a partial view of the ramp as seen along a line VII—VII of FIG. 2.
Figure 8:
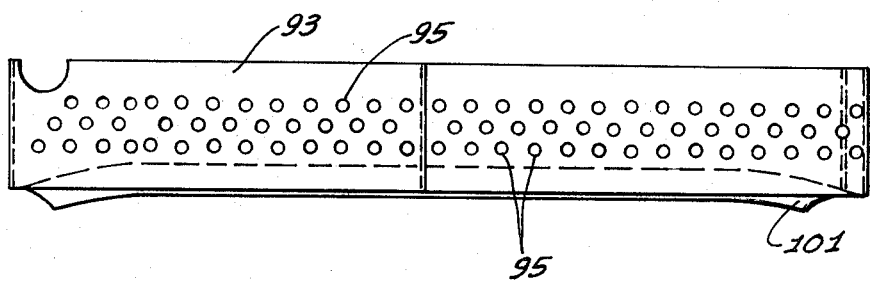
FIGS. 8 and 9 are a front elevation and a bottom plan view, respectively, of the ramp walkway surface, showing it removed from the ramp.
Figure 9:
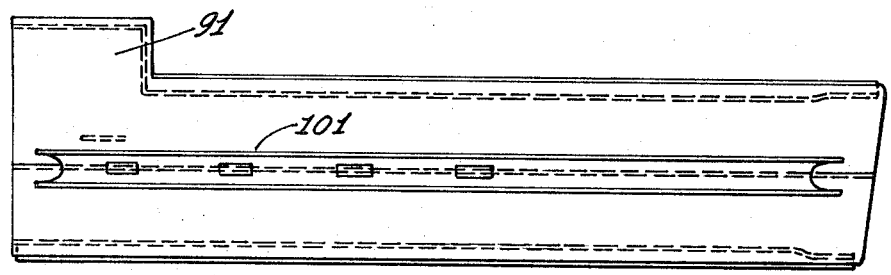

As shown in FIG. 1, an aircraft 11 having large sweptback wings 13 may be provided with a series of emergency exits 15.

From each of these emergency exits, an inflatable evacuation slide of the type taught in U.S. Pat. No. 3,712,417 may be extended as the exit doors are opened. Above the wings of the aircraft, a pair of emergency exits 17 are provided. It becomes quite apparent from the illustration of FIG. 1 that the use of slides to extend from the emergency exits 17 would produce a useless device since no provision would be made for moving evacuating passengers from the wing to the ground. Therefore, a ramp 19 such as that formed in accordance with the present invention may be provided to allow passengers to traverse the surfaces of the wings without injury to themselves or damage to the wings and then to slide to the ground from the outer end of the ramps. In FIG. 2, a patch element 20 is shown to which a slide (not shown) may be attached in a well-known manner for quick detachment. This allows the ramp and slide to be produced as two distinct units which are not interconnected, thereby providing increased safety if one unit should become damaged or fail to inflate in a situation in which a flotation device is required, such as a ditching at sea.

Various support tubes on the lower surface of the ramp may be provided to properly support the ramp relative to the upper surface of the wing and any other structural member which may be present on the craft.

As shown in FIG. 2, the inner end of the ramp 19 may be provided with any suitable configuration such that it is held closely against the side of the aircraft 11 and is forced to extend in the desired direction as it is inflated. The ramp may be fastened aircraft by means of a bar 25 fastened to the floor of the craft by a crew member when the door is closed or when the case in which the ramp is carried is mounted in the aircraft.

As previously stated, FIG. 3 is a top plan view and FIG. 6 is a bottom plan view of tubular structure which may be used to form the ramp. As shown, a first tube 41 may be provided immediately adjacent the edge of the aircraft. An aspirator 43 may be positioned therein and operated by means of a gas bottle 45 fastened to the bottom of the tube. A pair of elongated base tubes 47 may extend outwardly or away from the tube 41 and terminate at an end tube 49. Air delivered to the tube 41 by means of the aspirator 43 is communicated to tubes 47 and tube 49. The tubes 41, 47, and 49 may form a suitable base, illustrated as being substantially rectangular, from which the remainder of the ramp is supported.

A plurality of cross tube members 51 may interconnect the elongated tubes 47 and be in communication therewith to provide support for the walkway surface as will hereinafter be described and to properly locate the elongated tubes 47 relative to one another. A first side hand or guard railing 55 and a second side hand or guard railing 57 are mounted on the base frame and comprise substantially horizontal tubes 59 and 61 (FIG. 5) which are supported by and in communication with a plurality of upstanding tubes 63. Tubes 63 are not in communication with the elongated base tubes 47, but are in communication through tubes 77 with tube 49 so that the railings 55 and 57 and the upstanding tubes 63 may be properly inflated. In other words, the waist-high side rails 55 and 57 and the upstanding tubes 63 are in communication with the base tubes 47 and, ultimately, aspirator 43 only by means of a pair of extended rail sections 58.

At the outer end of the railing 57, an offset portion 71 is formed so that a crew member may stand at that location, as clearly illustrated in FIG. 2, and aid and encourage deplaning passengers to jump from the end of the ramp onto the slide (not shown). A short horizontal safety tube 73 located close to the end of the ramp extends at a waist-high level toward the walkway area from the railing 57 to prevent the crew member from inadvertently stepping or falling from the end of the ramp.

Each of the railings 55 and 57 terminate at the outer end of the ramp in extended rail sections 58 (FIG. 4) to further ensure that deplaning passengers do not land on any surface other than a slide when they leave the ramp. The extensions also provide psychological reassurance so that evacuees will not tend to hesitate in jumping from the ramp when their safety and the safety of other passengers may depend upon their speed.

As stated above, the side rails 55 and 57 and the upright support tubes 63 may be provided with an inflation pathway only through the extended sections 58. Thus, until the base tubes 47 and other base support members are substantially fully extended, the side rails are not inflated and elevated. In order to ensure that the side rails do not become elevated until the tubes 47 are relatively firm and thereby fixed in position, however, any suitable restrictor or shut-off device 77 (FIG. 4) may be provided to positively prohibit the flow of air through each section 58 until the desired instant. A suitable restrictor pin or other latching element 86 may also be suitably fastened to each tube 47 by means of a line 88 so as to release the restrictor at the suitable time.

Figure 10:
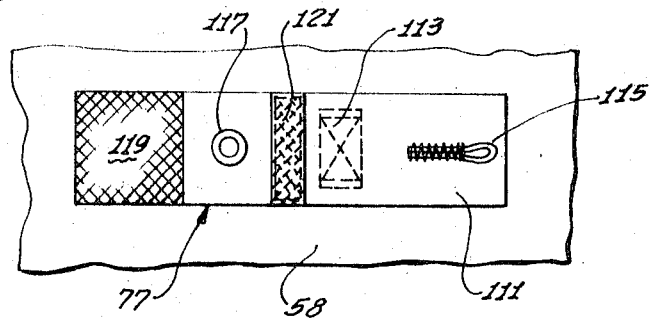
FIG. 10 comprises a slide elevation of a preferred embodiment of a restrictor device which may be utilized to prevent the ramp side guard rails from being inflated until after the ramp has been fully extended, shown after being released for inflation of the rails.

Referring to FIG. 10, it is seen that, in one form, each restrictor 77 may comprise a flexible patch or strip 111 which is suitably attached to its respective section 58 by any suitable means such as gluing or stitching 113. Thus, there is only a relatively small interface between each strip 111 and its section 58. Consequently, when the sections 58 are deflated during assembly, the ends of the strips 111 can be wrapped around the sections, away from the viewer as seen in FIG. 10, allowing a loop 115 fastened to each strip to be passed from below and through a grommet 117. Subsequently, a pin 86 (FIG. 4) may be passed through each loop 115 to hold the restrictor closed until the pin is removed during inflation.

If desired, the strip may be provided with suitable fastening elements, such as Velcro strips 119 and 121, allowing one leg of the strip to be folded over the pin, grommet, and loop 115 so that the pin cannot wear or puncture the ramp material when the latter is folded up.

In operation, as the ramp is unrolled by inflation of the tubes 47, the inflation air will be prevented from passing through sections 58 by the restrictors. As the pressure in tubes 47 increases, they will tend to extend to their full length and a strain will thus be generated in the lines 88 as the point on the tubes to which the lines are attached and the restrictors 77 are moved apart. This will cause the lines 88 to pull the pins 86 out of the loops 115, opening the sections 58 and allowing inflation of each of the rails.

As a result of this feature, the ramp will be unrolled across the wing with a very low wind profile which will present a minimum sail area. The ramp will be properly located in position on the wing prior to inflation of the rails and it will be firmly fixed in position before any appreciable sail area is developed. Thus, the slide may be subsequently inflated beyond the ramp end element 20 at a location from which it may be properly used as a slide.

Suitable support tubes, which may be provided in shapes determined by the structure of the wing and aircraft, may be suspended beneath the rectangular base. For example, as shown in FIGS. 4 and 5, a tube 81 having a truncated conical peripheral configuration may be attached to and suspended from a cross tube member 51 in such a manner as to be in communication therewith so that it is inflated as the rest of the ramp inflates. Tube 81 will rest directly on the surface of the aircraft wing and will cause the ramp to be positioned in a location such that the walkway floor is in the same plane as the floor inside the aircraft. At the outer end of the ramp, also by way of example, one or more cylindrical support tubes 83 may be positioned at the forward side of the ramp to rest on the upper surface of an aircraft engine 21 suspended from the wing 13, in the manner shown in FIG. 7. These tubes may be in communication with the elongated tube 47 so that they are also inflated as the ramp inflates. Depending upon the curvature of the upper surfaces of the wing, other supports may be provided or the cross tube members 51 may rest directly on the wing.

Referring now to FIGS. 2, 4, 8, and 9, the ramp floor surface 91 is formed as an integral part with a pair of side walls 93 which, if desired, may be provided with a plurality of apertures 95 therein which will prevent the ramp from being moved relative to the wing by any wind which may be blowing.

If it is desired to form the ramp with two distinct passenger walkways thereon, a central divider tube 97 may be provided in communication with tube 41 and attached to tube 49 by means of a patch 99 as shown in FIG. 3. The divider tube 97 will be supported by the cross tube members 51 and properly positioned thereby as it is inflated. As the divider tube is inflated, it deforms the surface of walkway 91, as shown in FIG. 5, to clearly delineate paths for two columns of evacuees.

A divider tube attachment flap 101 may be located on the bottom of the walkway surface 91 and may be bonded to the divider tube 97 in any desired manner. It should be noted that the provision of the divider tube which is supported by the cross members 51 also adds additional support to the walkway surface 91 between the cross members. Thus, the divider tube not only clearly delineates two distinct walkways along the ramp but also aids in supporting the walkway surface. Of course, if a single lane slide extends from the outer end of the ramp, it may be desired to provide only one walkway on the ramp and the divider tube could be eliminated in that case.

A review of the above Detailed Description of one form of the invention which is delineated by the following claims makes clear that the invention thus claimed provides a new and improved concept in the art of safety equipment which yields a valuable advancement in that art. Many modifications, alterations, and other embodiments of the invention will now become apparent to those skilled in the art without departing from the true scope of the invention, wherefore

What is claimed as the invention is:

1. An inflatable device for use in evacuating aircraft passengers departing from an exit over the wing of the aircraft comprising
    an elongated structure forming a base member and defined by
    a first pair of elongated tubular members,
    a second pair of relatively short tubular members extending between said first pair of tubular members near the ends thereof and in fluid communication therewith,
    means near a first end of said base member adjacent the wing of the aircraft for receiving inflation injecting fluid for introduction into said base member, and
    handrail means extending along and supported by said first pair of tubular members and in fluid communication with said base member only near the end thereof distal from the location for injection of air by said inflation means and
    control means disposed in the path of fluid communication between said handrail means and said base member for providing for the inflation of said handrail means only after an inflation of said base member to extend the first pair of elongated tubular members to their elongated position.

2. The device of claim 1 including
    an offset portion adjacent at least one end of said device providing space for a person to stand out of the path of evacuees traversing said walkway surface.

3. The device of claim 1 including
    means in the control means for positively prohibiting inflation of said handrail means until said base member has been substantially completely inflated.

4. The device of claim 1 wherein
    said handrail means comprises
    a substantially tubular elongated member extending along said base member and elevated relative thereto and
    a plurality of inflatable support members at spaced intervals extending between one of said base member elongated members and said handrail elongated member and in fluid communication only with the latter.

5. The device of claim 4 wherein said vehicle is an aircraft and said device is extended across a wing thereof, and including
means for releasably attaching said device at one end thereto said aircraft
means at the other end thereof for releasably attaching an additional evacuation device for passage of evacuees from said device to the ground.

6. The device of claim 1 including
at least one inflatable cross support member extending between and in fluid communication with said first pair of tubular members and located intermediate said second pair of tubular members, and
a walkway surface supported by said base member and said at least one cross support member.

7. The device of claim 6 including
means supported by said cross tube members for dividing said walkway surface into a plurality of evacuation paths.

8. The device of claim 6 wherein
said inflatable means includes
means associated with said elongated base member and in communication therewith for supporting said base member upon a multi-plane surface so as to maintain said walkway means within a predetermined plane.

9. The device of claim 6 including
means for deforming said walkway means to produce two distinct evacuee walkway paths thereon.

10. The device of claim 6 having two such handrails, and means attached to said walkway means and extending upwardly along said handrails to prevent evacuees from stepping or falling through said handrails.

11. The device of claim 6 wherein the fluid receiving means are disposed in a particular one of the elongated tubular members at a position near the wing of the aircraft and the control means are disposed in the particular one of the tubular members at the distal end of the tubular member and are constructed to normally prevent the passage of fluid into the handrail means and are responsive to at least a partial inflation of the tubular member to provide for the passage of fluid into the handrail means.

12. An aircraft evacuation aid comprising
an elongated tubular structure comprising
a pair of elongated leg members, cross tube members extending between the elongated legs of said tubular structure and in inflatable communication therewith, and
a divider tube supported by said cross tube members, extending parallel to the elongated legs of said tubular structure, and in inflatable communication with said tubular structure,
means fastened to and in inflatable communication with said tubular structure and said cross tube members for supporting said tubular structure in a predetermined plane relative to said aircraft,
handrail means supported by and in inflatable communication with said tubular structure, and
means for inflating all of the above-recited elements including
means for inflating said above-recited elements in sequence so that said handrail means is inflated after the remainder of said above-recited elements are substantially fully inflated.

13. The device of claim 12 including
walkway means supported by said tubular structure, cross tube members, and divider tube for easy traversal of the evacuation aid, and
means extending from said walkway means upwardly along said handrail means to prevent accidental departure of an evacuee from the aid through said handrail means.

14. A device for use in evacuation of a vehicle comprising
an inflatable means having
an elongated base member providing
means across which evacuees may walk in leaving the vehicle and
means in inflatable communication with said base member and extending upwardly therefrom to prevent evacuees from falling off said walk-way means, and
means for inflating said inflatable means in sequence so that said base member is substantially fully inflated prior to inflation of said prevention means.

15. The device of claim 14 wherein
said sequence inflating means includes
restrictor means which prevent passage of air from said base member to said prevention means until the said base member is nearly completely inflated.

16. An inflatable device for use in evacuation of a vehicle when inflated by inflation apparatus comprising
an inflatable base member inflatable near the end adjacent to the vehicle, into an elongated configuration,
a walkway surface supported by said base member,
an inflatable guard rail means fixed to and in fluid communication with said base member and comprising
a substantially tubular elongated member extending substantially parallel to said base member,
a plurality of inflatable upstanding tubular members disposed between the base member and the guard rail means at spaced intervals for support of the guard rail means, the tubular members being in fluid communication with said tubular member,
said guard rail means and said base member being disposed in fluid communication near the end of said device removed from the vehicle,
means for introducing inflation air into said device near the end adjacent to the vehicle, and
means in the path of fluid communication between the guard rail means and the base member for inhibiting introduction of the inflatable air until the inflation of the base member to provide the base member with the elongated configuration and for thereafter providing for the introduction of the inflatable air into the guard rail means.

17. The device of claim 16 including
side wall means extending from said walkway surface to said tubular member to prevent passage of evacuees between the locations of said upstanding members.

18. The device of claim 16 wherein said base member comprises
a pair of spaced elongated inflatable tubular means, a pair of shorter inflatable tubular means extending between said elongated means near each end thereof, and at least one cross tube means interconnecting said elongated inflated tubular means intermediate said pair of shorter tubular means and wherein the air-introducing means introduces air into a particular one of the elongated tubular means near the end of such elongated tubular means adjacent to the vehicle and the inhibiting means are disposed in the particular one of the elongated tubular means at a position near the other end of such elongated tubular means.

19. The device of claim 18 wherein
said base member and said guard rail means each includes
an inflatable offset tubular means in fluid communication therewith to protect and support a person standing out of the path of evacuees traversing said walkway surface.

20. The device of claim 18 wherein
said inhibiting means includes first means normally disposed in said base member in a position to block the passage of air into the guard rail means and includes second means cooperative with the first means and tensioned by the elongation of the elongated inflatable tubular means in the base member to remove the first means from the position blocking the passage of air into the guard rail means.

21. An inflatable device for use in evacuating a vehicle, such as an aircraft, via extis located above a surface, such as a wing, which surface must be traversed by evacuees, comprising
an elongated base member to be supported by the surface to be traversed comprising
a first pair of spaced elongated tubular members which, when inflated, extend along the path of movement of the evacuees, and
a second pair of relatively shorter tubular members extending between said first pair of tubular members near the ends thereof and in fluid communication therewith, and
handrail means extending along and supported by said base member comprising
a substantially tubular elongated member extending substantially parallel to said base member,
a plurality of inflatable upstanding members extending between said base member and said handrail elongated tubular member to locate and support the latter relative to said base member, and
means for closing off the tubular elongated member in the handrail means from inflation until the base member has extended substantially across the wing surface to be traversed by the evacuees.

22. The device of claim 21 wherein
said base member further includes
at least one cross support member extending between and in fluid communication with said first pair of tubular members and located intermediate said second pair of tubular members.

23. The device of claim 21 wherein
said inflatable upstanding members extend between one of said first pair of elongated tubular members and said handrail elongated tubular member.

24. The device of claim 21 including a walkway surface supported by said first and second pairs of tubular members.

25. The device of claim 24 including
an elongated tubular member extending between said second pair of tubular members and intermediate said first pair of tubular members for dividing said walkway surface into a plurality of distinct walkway paths.

26. The device of claim 21 including
means extending between said handrail means and said base member for preventing evacuees from inadvertently falling from said device and having
means for reducing the effect of wind acting against said preventing means.

27. The device of claim 21
wherein the closing means are disposed in a particular one of the elongated tubular members in the base member and are operative to normally block the passage of air into the tubular member in the handrail means and are responsive to at least a particular pressure in the particular one of the elongated tubular members in the base member to permit the passage of air under pressure into the tubular member in the handrail means.

28. The device of claim 21 including inflatable offset means in said base member and inflatable offset means in said handrail means defining an aid's station adjacent the extremity of the device distal from the vehicle to be evacuated.

29. An inflatable ramp across which persons may walk comprising
a first pair of inflatable support members extending in the direction in which persons are to walk and supportable by a surface to be traversed,
a second pair of inflatable support members elevated above and substantially parallel to said first pair of members and respectively associated with individual ones of the support members in the first pair to prevent persons traversing the ramp from leaving it except at the ends thereof,
inflatable support means extending between each one of said first pair of inflatable support members and an associated one of said second pair of inflatable support members at predetermined intervals along said ramp for supporting and locating said second pair of members relative to said first pair of members,
at least a third pair of inflatable support members each extending between said first pair of members at a spaced position to support and locate said first pair of members relative to one another,
flexible surface means located between and supported by said first pair of inflatable support members and said second pair of said inflatable support members,
the inflatable support members in the first and second pairs being disposed in fluid communication with one another, and
means disposed to inhibit the fluid communication between the inflatable support members in the first pair and the inflatable support members in the second pair until the inflatable support members in the first pair have extended substantially across the surface to be traversed 30. The ramp of claim 29 including
inflatable means extending below said first pair of members and suspended from said ramp to compensate for known irregularities from horizontal in the surface to be traversed so as to maintain said flexible surface in a substantially constant plane.

* * * * *